United States Patent
Sodagar

(10) Patent No.: US 11,593,150 B2
(45) Date of Patent: Feb. 28, 2023

(54) METHOD AND APPARATUS FOR CLOUD SERVICE

(71) Applicant: TENCENT AMERICA LLC, Palo Alto, CA (US)

(72) Inventor: Iraj Sodagar, Los Angeles, CA (US)

(*) Notice: Subject to any disclaimer, the term of this patent is extended or adjusted under 35 U.S.C. 154(b) by 0 days.

(21) Appl. No.: 17/326,049

(22) Filed: May 20, 2021

(65) Prior Publication Data

US 2022/0107832 A1     Apr. 7, 2022

Related U.S. Application Data

(60) Provisional application No. 63/087,730, filed on Oct. 5, 2020.

(51) Int. Cl.
| | |
|---|---|
| *G06F 9/46* | (2006.01) |
| *H04L 67/10* | (2022.01) |
| *H04L 67/12* | (2022.01) |

(52) U.S. Cl.
CPC ............... *G06F 9/46* (2013.01); *H04L 67/10* (2013.01); *H04L 67/12* (2013.01)

(58) Field of Classification Search
CPC ......... G06F 9/46; G06F 9/5027; H04L 67/10; H04L 67/12
See application file for complete search history.

(56) References Cited

U.S. PATENT DOCUMENTS

| | | | |
|---|---|---|---|
| 9,020,621 | B1 | 4/2015 | Proctor et al. |
| 2014/0188978 | A1 | 7/2014 | Ng et al. |
| 2019/0222621 | A1 | 7/2019 | Kolan et al. |
| 2020/0020077 | A1* | 1/2020 | You .................. H04L 65/765 |
| 2020/0341802 | A1 | 10/2020 | Sodagar |

FOREIGN PATENT DOCUMENTS

WO     2020188140 A1     9/2020

OTHER PUBLICATIONS

International Search Report and Written Opinion dated Aug. 31, 2021 issued in corresponding application No. PCT/US2021/036824.
"Text of ISO/IEC FDIS 23090-8 Network-based media processing", International Organisation for Standardisation Organisation Internationale De Normalisation ISO/IEC JTC1/SC29/WG11 Coding of Moving Pictures and Audio, ISO/IEC JTC1/SC29/WG11/N19062, Brussels, BE, Jan. 2020 (105 pages).
"Potential improvements of ISO/IEC 23090-8 AMD 1 NBMP Function Templates", ISO/IEC JTC 1/SC 29/WG 11 Coding of moving pictures and audio, ISO/IEC JTC 1/SC 29/WG11, N19439, Covenorship: UNI (Italy), Jul. 20, 2020 (103 pages).

* cited by examiner

*Primary Examiner* — Kim T Nguyen
(74) *Attorney, Agent, or Firm* — Arentfox Schiff LLP

(57) ABSTRACT

Aspects of the disclosure provide methods and apparatuses for network based media processing. For example, an apparatus in a cloud for network based media processing (NBMP) includes processing circuitry. The processing circuitry receives information associated with an entity in the cloud for NBMP. The processing circuitry obtains an NBMP entity identifier from the information associated with the entity. Then, the processing circuitry interprets the information associated with the entity based on the NBMP entity identifier.

15 Claims, 6 Drawing Sheets

METHOD AND APPARATUS FOR CLOUD SERVICE

INCORPORATION BY REFERENCE

This present application claims the benefit of priority to U.S. Provisional Application No. 63/087,730, "NETWORK ENTITY IDENTIFIERS FOR MEDIA NETWORK ELEMENTS IN CLOUD" filed on Oct. 5, 2020. The entire disclosure of the prior application is hereby incorporated by reference in its entirety.

TECHNICAL FIELD

The present disclosure describes embodiments generally related to cloud service.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various media applications and services require significant processing capability. In some examples, cloud processing is preferred where workloads that otherwise would have been performed on a client device, can be offloaded to remote servers. Because the remote servers have much higher computation capacity, complex media processing tasks can be performed by the remote servers and then final results or near-to-final results can be sent to the client device.

SUMMARY

Aspects of the disclosure provide methods and apparatuses for network based media processing. In some examples, an apparatus in a cloud for network based media processing (NBMP) includes processing circuitry. The processing circuitry receives information associated with an entity in the cloud for NBMP. The processing circuitry obtains an NBMP entity identifier from the information associated with the entity. Then, the processing circuitry interprets the information associated with the entity based on the NBMP entity identifier.

In some examples, processing circuitry of an apparatus in a cloud for NBMP can include an NBMP entity identifier in information associated with an entity in the cloud for NBMP, and transmit the information that includes the NBMP entity identifier.

In some embodiments, the NBMP entity identifier is indicative of a supporting standard that the entity complies to. Further, in an example, the NBMP entity identifier is indicative of a version of the supporting standard.

In some examples, the NBMP entity identifier is indicative of a function of the entity in the cloud for NBMP.

In some examples, the NBMP entity identifier is indicative of an application programming interface (API) for interactions with the entity.

In some examples, the NBMP identifier is indicative of one of a workflow manager, a media processing entity (MPE), a NBMP source, and a function repository.

In some examples, the NBMP entity identifier is in a uniform resource name (URN) scheme.

Aspects of the disclosure also provide a non-transitory computer-readable medium storing instructions which when executed by a computer for cloud service cause the computer to perform the method for cloud service.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
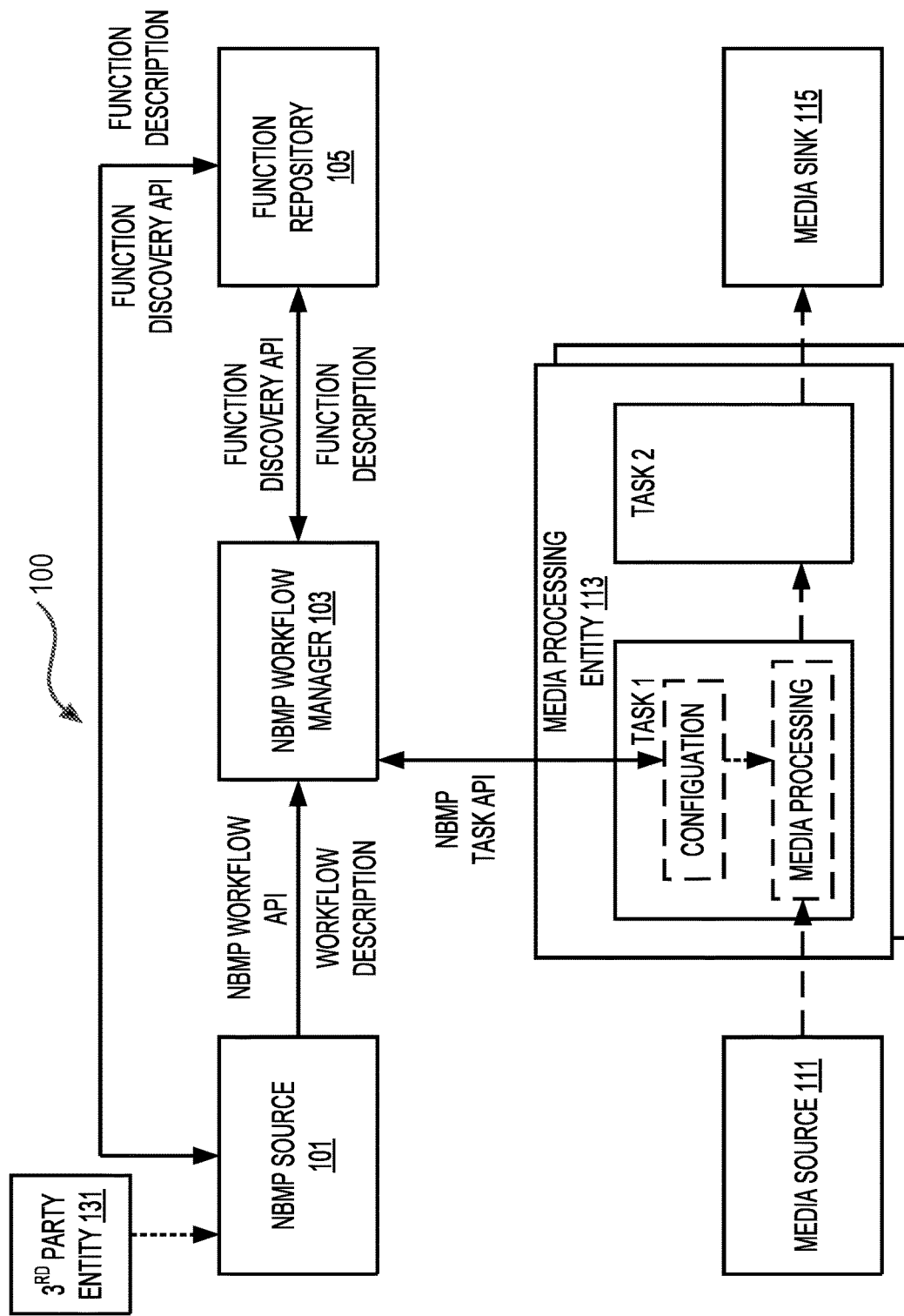
FIG. 1 shows an exemplary media processing system according to an embodiment of the disclosure.

Cloud computing refers to the practice of using a network of remote servers on a network (e.g., the Internet) to deliver information computing services (e.g., cloud services). The network architecture (e.g., including hardware and software) through which the cloud services are provided to service consumers (e.g., clients) is referred to as the cloud. Cloud computing provides access to a wide range of services, such as data processing, media processing, server, storage, network, applications, online services and the like. In some examples, media processing becomes compute intensive, and thus a media processing cloud can be used to offload significant media processing workloads to remote servers.

Generally, a cloud computing system includes a network, one or more servers, and one or more client devices. The network facilitates communications between the servers and client devices. A client device may be, for example, a smartphone, a tablet computer, a laptop, a personal computer, a wearable device, a head-mounted display (HMD), or the like. A server can include any suitable computing or processing device that can provide computing services for one or more client devices. For example, each server can include one or more processing devices, one or more memories storing instructions and data, and one or more network interfaces facilitating communication over the network. In some embodiments, a server includes a workflow manager that can select functions and build a workflow pipeline to perform a processing task.

Some aspects of the present disclosure provide techniques for identifying network-based media processing entities in cloud processing. In some related examples, such as described in ISO/IEC JTC1/SC29/WG11/N19439, a single general identifier is used for entities in a cloud for network based media processing (NBMP). Thus, during an operation, additional processing time or communication is needed to recognize various properties of the entities in order for deployment of network based media processing.

According to some aspects of the present disclosure, each entity in a cloud for NBMP can be defined with a unique NBMP entity identifier. Thus, in some embodiments, the unique NBMP entity identifier can enable property recognitions based on the NBMP entity identifier and thus can make deployment of network based media processing more efficiently.

A media processing system can include various entities, such a workflow manager, a function repository, a media processing entity (MPE), a NBMP source, and the like that have different functionalities.

In a media processing system, a NBMP source describes the requested media processing and provides information about the nature and format of the media data. Accordingly, an NBMP workflow manager can establish a media processing workflow and informs the NBMP source that the workflow is ready, and then media processing can start. For example, media source(s) can then start transmitting media to the network for processing.

In some embodiments, an NBMP workflow includes media processing tasks that are connected based on input/output relationships among the media processing tasks. Each of the media processing tasks performs a media processing operation, such as video decoding, video stitching, video encoding, and/or the like. In an example, a first media processing task performs a media processing operation based on inputs and generates outputs. The outputs of the first media processing task can be used as inputs to a second media processing task that is connected with the first media processing task. In other words, an NBMP workflow can be considered as a connected graph of media processing tasks.

The workflow manager can ensure the correct operation of the workflow by configuring and monitoring each task as well as the workflow output. In some examples, the workflow manager is configured to the select the media processing functions and instantiate the media processing functions as tasks based on the workflow description that is received from the NBMP source.

In a media processing system, suitable interactions can be performed to establish, load, instantiate and monitor media processing entities that will run the media processing tasks. In some examples, application programming interfaces (APIs) can be defined between an NBMP source and workflow manager; workflow manager and task(s); and an API is defined to discover appropriate function(s). In some examples, a media processing system is configured to be media format and protocol agnostic. The media processing system can identify and signal the media, metadata and auxiliary information formats for data exchanged between media source, the workflow manager and tasks.

In some examples, interfaces including both data formats and application programming interfaces (APIs) among the entities connected through digital networks for media processing can be defined. Users can access and configure user operations remotely for efficient, intelligent processing. The workflows to be applied to media data can be described and managed. The media data can be uploaded to the network, and the media processing tasks can be instantiated and configured. In some embodiments, dynamic creation of media processing pipelines, as well as access to processed media data and metadata in real-time or in a deferred way are enabled. The media and metadata formats used between the media source, workflow manager and media processing entities in a media processing pipeline are also specified.

In an example, clients (e.g., creators, service providers, and consumers of digital media) can describe media processing operations to be performed by media processing entities in a network. A workflow can be described by composing a set of media processing functions that are accessible through interfaces (e.g., NBMP APIs). A media processing entity (MPE) can run processing tasks applied on the media and the related metadata received from media source(s) or other tasks. The MPE can provide capabilities for configuring, managing, and monitoring processing tasks. A media processing task can be a process applied to media and metadata input(s), producing data and related metadata output(s) to be consumed by a media sink or other media processing tasks.

The media processing system can support various delivery methods such as streaming, file delivery, push-based progressive download, hybrid delivery, multipath, and heterogeneous network environments.

FIG. 1 shows an exemplary media processing system (e.g., NBMP system, a NBMP reference architecture, a NBMP architecture) (100) according to an embodiment of the disclosure. The media processing system (100) can include a plurality of entities, such as a NBMP source (101), a workflow manager (e.g., a NBMP workflow manager) (103), a function repository (105), a media source (111), a media processing entity (MPE) (113), a media sink (115), a third party entity, and/or the like. The media processing system (100) can include additional media source(s), media sink(s), and/or media processing entities. The media processing system (100) can process media data across one or more processing entities in a network. Information, such as various media and control information (or control data) for the media, can be communicated among the plurality of entities in the media processing system (100).

To provide a context for discussion purposes, the media processing system (100) is described as the NBMP system (100) below. The descriptions can be suitably adapted to any media processing system.

The NBMP source (101) can describe, or otherwise indicate, media processing in the network. The function repository (105) can include NBMP function descriptions of various NBMP functions. The NBMP source (101) and the workflow manager (103) can retrieve the NBMP function descriptions or functions from the function repository (105). An NBMP function can refer to implementation of a stand-alone and self-contained media processing operation and/or the corresponding description of the operation.

A processing task or a task can refer to a runtime instance of a NBMP function that is executed by the MPE (113). An NBMP workflow or a workflow can be represented by a graph (e.g., a directed acyclic graph (DAG)) of one or more connected task(s) that achieve the requested media processing. The workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103) and the MPE (113)) in the NBMP system (100) can use APIs to invoke and respond to media service requests. The APIs can include a NBMP workflow API or a workflow API, a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., CreateWorkflow), updating a workflow (e.g., UpdateWorkflow), deleting a workflow (e.g., DeleteWorkflow), retrieving a workflow (e.g., RetrieveWorkflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created, and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not be aware of a set of functions to be inserted into the workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information received from the NBMP source (101) and configure the corresponding tasks. The configuration of the tasks can be performed using a task API (e.g., NBMP task API).

Task allocation and distribution can be described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2:
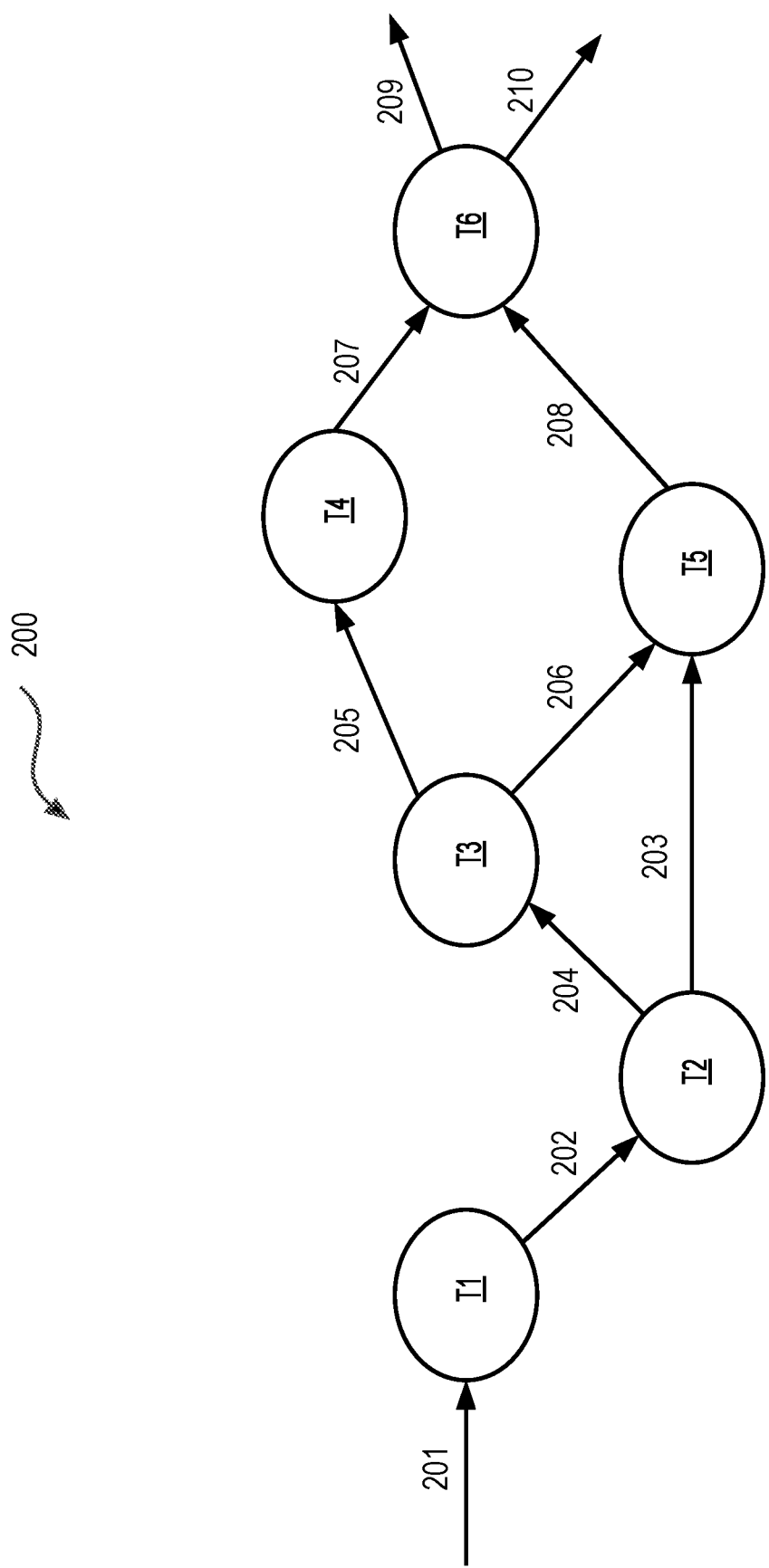
FIG. 2 shows an example of a graph according to an embodiment of the disclosure.

The workflow manager (103) can generate a workflow, for example, as represented by a graph (e.g., a DAG) from the WDD. FIG. 2 shows an example of a graph (e.g., a DAG) (200) according to an embodiment of the disclosure. The DAG (200) can include a plurality of nodes (T1)-(T6) and a plurality of links (or connections) (202)-(208). In an example, the DAG (200) represents the workflow (200).

Each node of the DAG (200) can represent a media processing task in the workflow (200). A link (e.g., the link (202)) connecting a first node (e.g., the node (T1)) to a second node (e.g., the node (T2)) in the DAG (200) can represent a transfer of an output of the first node (e.g., the node (T1)) as an input to the second node (e.g., the node (T2)).

In general, a workflow can include any suitable number of input(s) (or workflow input(s)) and any suitable number of output(s) (or workflow output(s)). The workflow input(s) can be connected to the media source (111), other workflow(s), and/or the like, and the workflow output(s) can be connected to the media sink (115), other workflow(s), and/or the like. The workflow (200) has an input (201) and outputs (209) and (210). The workflow (200) can have one or more outputs from intermediate nodes in some embodiments.

According to some aspects of the disclosure, separate NBMP entity identifiers are used for each of the entities in a media processing system, such as the media processing system (100). For example, the media processing system (100) includes four NBMP entities: a workflow manager, a function repository, a MPE, and a NBMP source, and thus four NBMP entity identifiers are used to respectively indicate the workflow manager, the function repository, the MPE, and the NBMP source. For example, a first NBMP entity identifier is used to indicate the workflow manager; a second NBMP entity identifier is used to indicate the function repository; a third NBMP entity identifier is used to indicate the MPE; and a fourth NBMP entity identifier is used to indicate the NBMP source. Thus, the NBMP entity identifiers can be used to indicate functions of the entities.

For example, when entity information associated with an entity includes the first NBMP entity identifier, the entity is a workflow manager and can perform function of the workflow manager; when entity information associated with an entity includes the second NBMP entity identifier, the entity is a function repository and can perform function of the function repository; when entity information associated with an entity includes the third NBMP entity identifier, the entity is a MPE and can perform function of the MPE; and when entity information associated with an entity includes the fourth NBMP entity identifier, the entity is a NBMP source and can perform function of the NBMP source.

According to an aspect of the disclosure, an NBMP entity identifier can be indicative of a supporting standard that the entity complies to. In some examples, the NBMP entity identifier can be indicative of a version of the supporting standard. In an example, entity information associated with an entity is received, and the entity information includes an NBMP entity identifier that is indicative of a supporting standard that the entity complies to and a version of the supporting standard. In some examples, the version of the supporting standard can be used as the language to interpret the entity information.

Further, in some examples, knowing the supporting standard and the version of the supporting standard of an entity, an interface, such as an application programming interface (API) can be determined. The interface can be used for interactions with the entity.

In some examples, an NBMP entity identifier can be included in a uniform resource name (URN) scheme.

Figure 3:
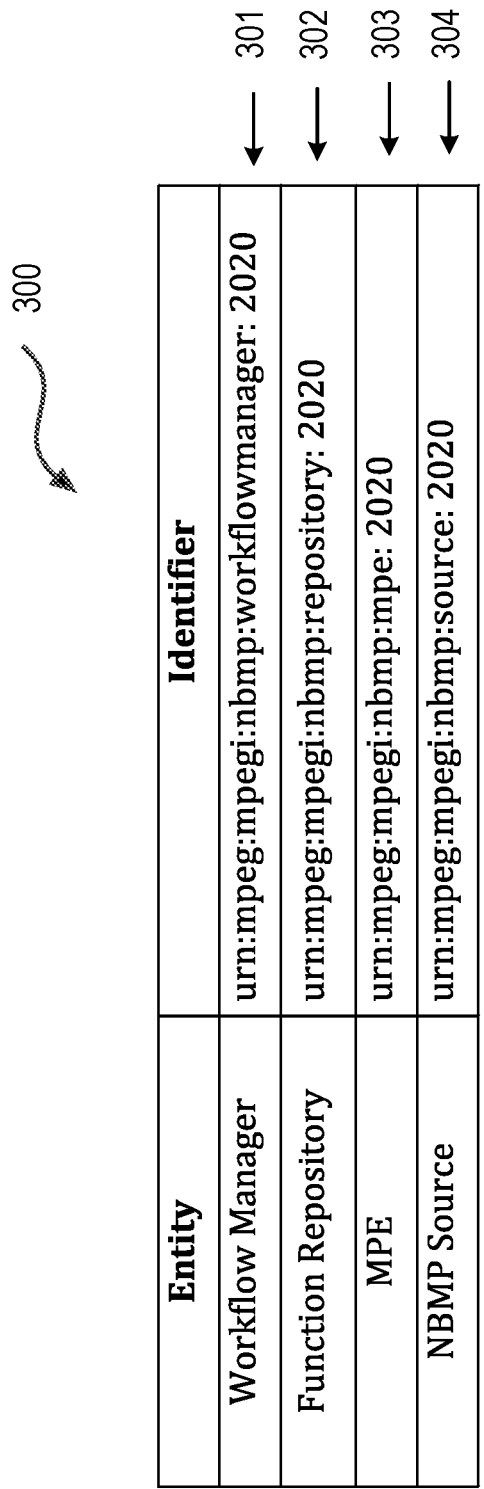
FIG. 3 shows a table of NBMP entity identifiers according to some embodiments of the disclosure.

FIG. 3 shows a table (300) of the NBMP entity identifiers in the URN scheme according to some embodiments of the disclosure. As shown in FIG. 3, each NBMP entity has a separate identifier (also referred to as NBMP entity identifier) associated with the NBMP entity. Specifically, a first NBMP entity identifier for the workflow manager is shown by (301); a second NBMP entity identifier for the function repository is shown by (302); a third NBMP entity identifier for the MPE is shown by (303); and a fourth NBMP entity identifier for the NBMP source is shown by (304).

In the FIG. 3 example, in the NBMP entity identifiers (301)-(304), 'urn:mpeg:mpegi:nbmp' can indicate the supporting standard (specification), and '2020' is the year of the supporting standard by which the version of the supporting standard can be recognized.

According to an aspect of the disclosure, the NBMP entity identifiers (301)-(304) can be used inside other descriptors. For example, the NBMP entity identifiers (301)-(304) can be used in URN that are universally unique. It is noted that a URN can include an NBMP entity identifier (e.g., one of (301)-(304)) and other suitable identifier.

Figure 4:
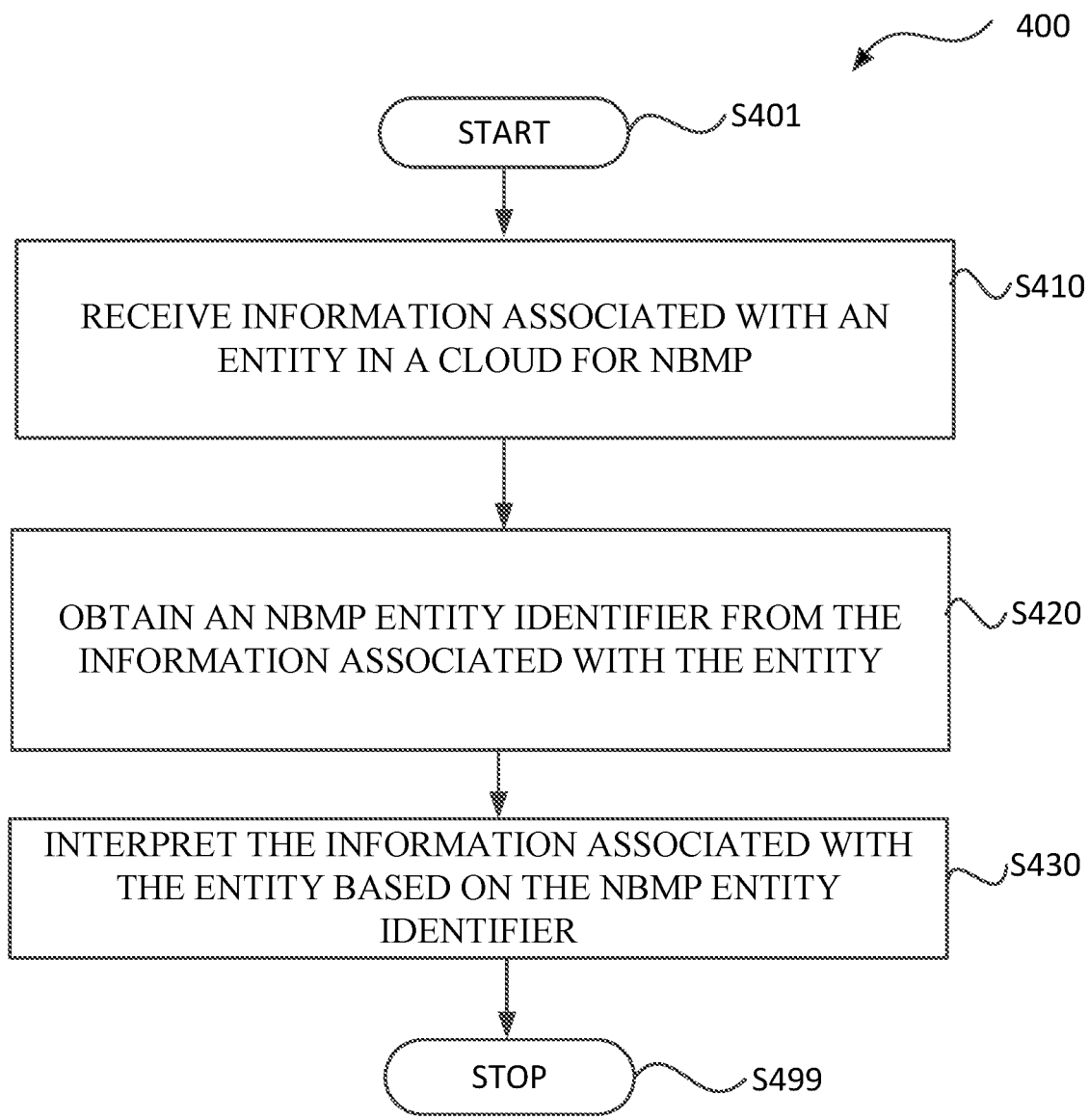
FIG. 4 shows a flow chart outlining a process in some examples of the disclosure.

FIG. 4 shows a flow chart outlining a process (400) according to an embodiment of the disclosure. In an example, the process (400) is executed by processing circuitry of a device in a cloud, such any device in the media processing system (100). In some embodiments, the process (400) is implemented in software instructions, thus when the processing circuitry executes the software instructions, the processing circuitry performs the process (400). The process starts at (S401) and proceeds to (S410).

At (S410), information associated with an entity in a cloud for network based media processing (NBMP) is received. In an example, the information associated with the entity is in an announcement from the entity. In another example, the information associated with the entity is in a response from the entity in response to an enquiry. In another example, the information associated with the entity is in a message sent out by the entity. In another example, the information associated with the entity is received during a service discovery.

At (S420), an NBMP entity identifier is obtained from the information. In an example, the processing circuitry parses the information to obtain the NBMP entity identifier. The NBMP entity identifier uniquely indicates one out of multiple NBMP entities, such as uniquely indicates one of a workflow manager, a function repository, a MPE, a NBMP source and the like.

The NBMP entity identifier is indicative of a function of the entity in the cloud for NBMP. In some examples, the NBMP entity identifier is in a form of uniform resource name (URN), such as shown by (301)-(304) in FIG. 3. In some examples, the NBMP entity identifier is indicative of a supporting standard that the entity complies to. Further, the NBMP entity identifier is indicative of a version of the supporting standard. In some examples, the NBMP entity identifier is indicative of an application programming interface (API) for interactions with the entity.

At (S430), the information associated with the entity is interpreted based on the NBMP entity identifier. Then, the process proceeds to (S499) and terminates.

The process (400) can be suitably adapted. Step(s) in the process (400) can be modified and/or omitted. Additional step(s) can be added. Any suitable order of implementation can be used.

Figure 5:
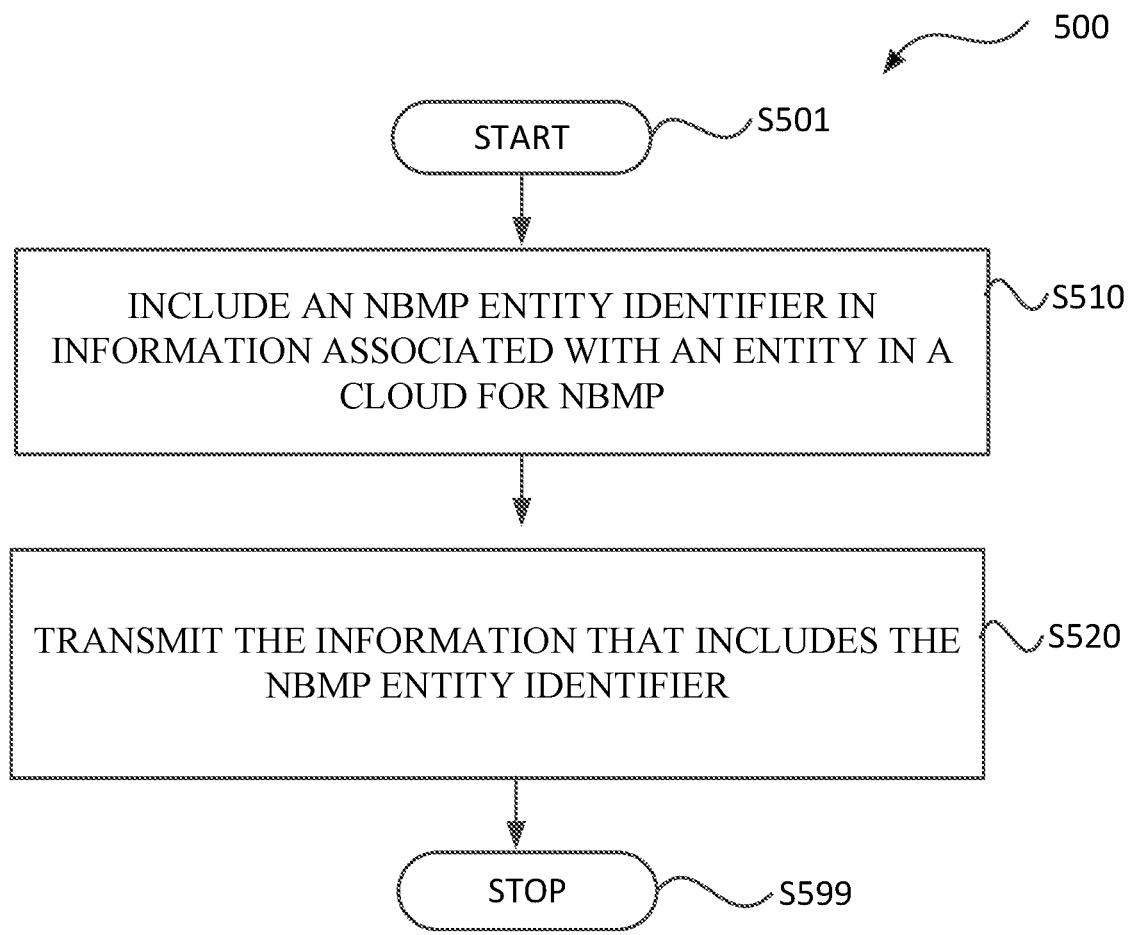
FIG. 5 shows a flow chart outlining another process in some examples of the disclosure.

FIG. 5 shows a flow chart outlining a process (500) according to an embodiment of the disclosure. In an example, the process (500) is executed by processing circuitry of an entity in a cloud, such any entity in the media processing system (100). In some embodiments, the process (500) is implemented in software instructions, thus when the processing circuitry executes the software instructions, the processing circuitry performs the process (500). The process starts at (S501) and proceeds to (S510).

At (S510), an NBMP entity identifier is included in information associated with an entity in a cloud for network based media processing. In an example, the information associated with the entity is in an announcement from the entity. In another example, the information associated with the entity is in a response from the entity in response to an enquiry. In another example, the information associated with the entity is in a message sent out by the entity.

The NBMP entity identifier uniquely indicates one out of multiple NBMP entities, such as uniquely indicates one of a workflow manager, a function repository, a MPE, a NBMP source and the like.

The NBMP entity identifier is indicative of a function of the entity in the cloud for NBMP. In some examples, the NBMP entity identifier is in a form of uniform resource name (URN), such as shown by (301)-(304) in FIG. 3. In some examples, the NBMP entity identifier is indicative of a supporting standard that the entity complies to. Further, the NBMP entity identifier is indicative of a version of the supporting standard. In some examples, the NBMP entity identifier is indicative of an application programming interface (API) for interactions with the entity.

At (S520), the information that includes the NBMP entity identifier is transmitted. Thus, when the information is received by other devices in the cloud, the NBMP entity identifier can be obtained from the information to enable interpretation of the information and further interactions with the entity. Then, the process proceeds to (S599) and terminates.

The process (500) can be suitably adapted. Step(s) in the process (500) can be modified and/or omitted. Additional step(s) can be added. Any suitable order of implementation can be used.

The techniques described above, can be implemented as computer software using computer-readable instructions and physically stored in one or more computer-readable media.

The methods and embodiments in the disclosure may be used separately or combined in any order. Further, each of the methods (or embodiments), functions or tasks, may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
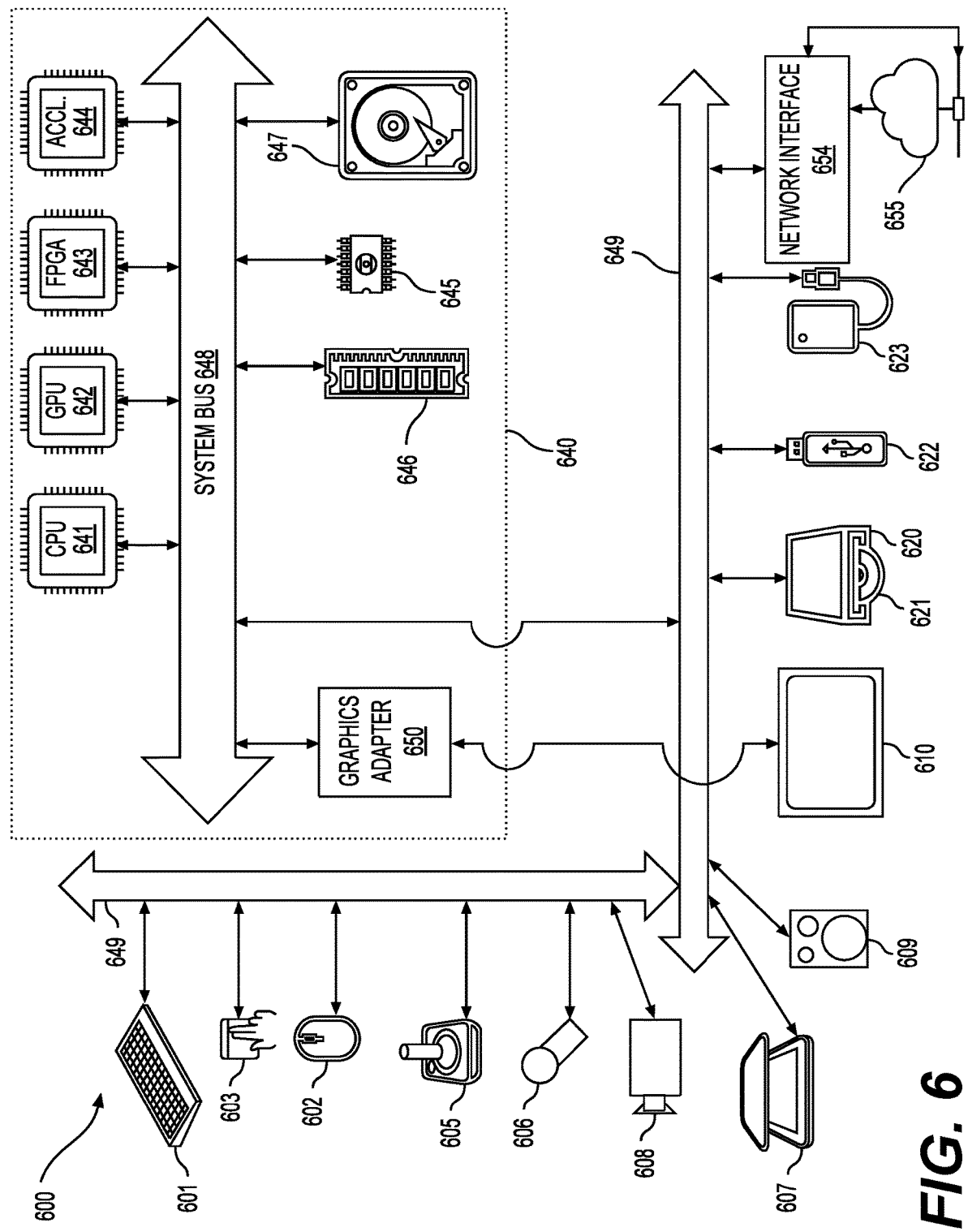
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joy-stick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface (654) to one or more communication networks (655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), graphics adapters (650), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). In an example, the screen (610) can be connected to the graphics adapter (650). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (600) having an architecture shown in FIG. 6, and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for network based media processing (NBMP), comprising:
   receiving, by processing circuitry, information from an entity in a cloud for NBMP;
   obtaining, by the processing circuitry, an NBMP entity identifier from the information received from the entity, the NBMP entity identifier included in the information received from the entity indicates (i) a function of the entity in the cloud, (ii) a media coding standard with which the entity complies, and (iii) a year of the media coding standard; and
   interpreting, by the processing circuitry, the information received from the entity based on the function of the entity, the media coding standard, and the year of the media coding standard indicated by the NBMP entity identifier.

2. The method of claim 1, wherein the year of the media coding standard indicated by the NBMP entity identifier is indicative of a version of the media coding standard.

3. The method of claim 1, wherein the NBMP entity identifier is indicative of an application programming interface for communicating with the entity.

4. The method of claim 1, wherein the function of the entity in the cloud indicated by the NBMP entity identifier is one of a workflow manager, a media processing entity (MPE), a NBMP source, or a function repository.

5. The method of claim 1, wherein the NBMP entity identifier is in a form of uniform resource name (URN).

6. A method for network based media processing (NBMP), comprising:
   including, by processing circuitry of an entity in a cloud for NBMP, an NBMP entity identifier in information to be transmitted by the entity, the NBMP entity identifier included in the information to be transmitted by the entity indicates (i) a function of the entity in the cloud, (ii) a media coding standard with which the entity complies, and (iii) a year of the media coding standard; and
   transmitting, by interface circuitry of the entity, the information that includes the NBMP entity identifier such that the information, when received, is interpreted based on the function of the entity, the media coding standard, and the year of the media coding standard indicated by the NBMP entity identifier.

7. The method of 6, wherein the year of the media coding standard indicated by the NBMP entity identifier is indicative of a version of the media coding standard.

8. The method of claim 6, wherein the NBMP entity identifier is indicative of an application programming interface for communicating with the entity.

9. The method of claim 6, wherein the function of the entity in the cloud indicated by the NBMP entity identifier is one of a workflow manager, a media processing entity (MPE), a NBMP source, or a function repository.

10. The method of claim 6, wherein the NBMP entity identifier is in a form of uniform resource name (URN).

11. An apparatus for network based media processing (NBMP), comprising:
    processing circuitry configured to:
    receive information from an entity in a cloud for NBMP;
    obtain an NBMP entity identifier from the information received from the entity, the NBMP entity identifier included in the information received from the entity indicates (i) a function of the entity in the cloud, (ii) a media coding standard with which the entity complies, and (iii) a year of the media coding standard; and
    interpret the information received from the entity based on the function of the entity, the media coding standard, and the year of the media coding standard indicated by the NBMP entity identifier.

12. The apparatus of claim 11, wherein the year of the media coding standard indicated by the NBMP entity identifier is indicative of a version of the media coding standard.

13. The apparatus of claim 11, wherein the NBMP entity identifier is indicative of an application programming interface for communicating with the entity.

14. The apparatus of claim 11, wherein the function of the entity in the cloud indicated by the NBMP entity identifier is one of a workflow manager, a media processing entity (MPE), a NBMP source, or a function repository.

15. The apparatus of claim 11, wherein the NBMP entity identifier is in a form of uniform resource name (URN).

* * * * *